United States Patent
Miyajima et al.

(10) Patent No.: US 7,551,605 B2
(45) Date of Patent: Jun. 23, 2009

(54) HOME GATEWAY APPARATUS

(75) Inventors: Akira Miyajima, Kanagawa (JP); Tomonori Shino, Kanagawa (JP); Tatsuo Bando, Tokyo (JP)

(73) Assignee: Panasonic Corporation, Osaka (JP)

( * ) Notice: Subject to any disclaimer, the term of this patent is extended or adjusted under 35 U.S.C. 154(b) by 689 days.

(21) Appl. No.: 10/974,782

(22) Filed: Oct. 28, 2004

(65) Prior Publication Data

US 2005/0144322 A1 Jun. 30, 2005

(30) Foreign Application Priority Data

Dec. 26, 2003 (JP) ............................. 2003-432863

(51) Int. Cl.
*H04L 12/66* (2006.01)
*H04M 3/42* (2006.01)
*G06F 15/16* (2006.01)

(52) U.S. Cl. .................. 370/352; 370/401; 379/220.01; 709/245

(58) Field of Classification Search ................. 370/235, 370/261, 352, 356, 392, 395.52, 401; 379/196, 379/207.02, 207.11, 221.08, 221.09, 220.01; 707/102; 709/226, 245
See application file for complete search history.

(56) References Cited

U.S. PATENT DOCUMENTS

| | | | |
|---|---|---|---|
| 6,678,265 B1 * | 1/2004 | Kung et al. .................. 370/352 |
| 6,839,421 B2 * | 1/2005 | Ferraro Esparza et al. ...................... 379/220.01 |
| 6,873,849 B2 * | 2/2005 | de la Red et al. ............ 455/445 |
| 6,885,871 B2 * | 4/2005 | Caloud ........................ 455/466 |
| 6,917,612 B2 * | 7/2005 | Foti et al. .................... 370/352 |
| 7,027,582 B2 * | 4/2006 | Khello et al. ........... 379/220.01 |
| 7,028,101 B2 * | 4/2006 | Costa-Requena et al. ... 709/245 |
| 7,106,473 B2 * | 9/2006 | Sekiguchi ................... 358/1.15 |
| 7,280,239 B2 * | 10/2007 | Sekiguchi ................... 358/1.15 |
| 7,328,014 B2 * | 2/2008 | Takeda et al. ............. 455/435.1 |
| 7,502,837 B2 * | 3/2009 | Westman et al. ............ 709/219 |
| 2002/0035624 A1 * | 3/2002 | Kim ............................ 709/222 |
| 2003/0007482 A1 * | 1/2003 | Khello et al. ................ 370/352 |

(Continued)

OTHER PUBLICATIONS

U.S. Appl. No. 10/995,503, to Miyajima et al., entitled "Communication Apparatus and Communication System,".

(Continued)

*Primary Examiner*—Alpus H Hsu
(74) *Attorney, Agent, or Firm*—Greenblum & Bernstein, P.L.C.

(57) ABSTRACT

A home gateway apparatus is connected to a DNS server that stores and manages telephone numbers and an external NAPTR record corresponding to each telephone number. The home gateway apparatus also includes and mutually connects a plurality of internal terminals. The home gateway apparatus includes an NAPTR record generator that generates an internal NAPTR record of all internal terminals; an internal NAPTR memory area that stores the generated internal NAPTR record; an external NAPTR memory area that stores an external NAPTR record, which is selected from the internal NAPTR record to be allowed to be disclosed to the DNS server; and a self NAPTR record notification unit that notifies the DNS server of the external NAPTR record so that the DNS server can register the external NAPTR record in association with a telephone number.

14 Claims, 12 Drawing Sheets

U.S. PATENT DOCUMENTS

| | | | | |
|---|---|---|---|---|
| 2003/0214955 A1* | 11/2003 | Kim | ............................ | 370/400 |
| 2004/0148416 A1* | 7/2004 | Aarnos et al. | ................ | 709/230 |
| 2004/0186850 A1* | 9/2004 | Chowdhury et al. | ......... | 707/102 |
| 2004/0193725 A1* | 9/2004 | Costa-Requena et al. | ... | 709/238 |
| 2005/0033852 A1* | 2/2005 | Tenhunen | .................... | 709/229 |
| 2006/0165056 A1* | 7/2006 | Komaki | ....................... | 370/352 |
| 2006/0259625 A1* | 11/2006 | Landfeldt et al. | ............ | 709/227 |

OTHER PUBLICATIONS

U.S. Appl. No. 10/995,506, to Miyajima et al., entitled "Communication Apparatus,".

U.S. Appl. No. 10/995,507, to Miyajima et al., entitled "Communication Apparatus," each of which was filed on Nov. 24, 2004.

Shigeki Goto et al., "Internet telephone and ENUM", Oct. 18, 2002.

* cited by examiner

Fig.4

Internal NAPTR record

| Device type extension number | Function | Service field | URI scheme |
|---|---|---|---|
| TV 31 | Voice access | E2U+sip | sip:13@localdomain |
| | image transmission request | E2U+web:http | http://13.localdomain/send?enum=¥3&cmd=¥2&mode=¥4!;svc=send |
| | ⋮ | ⋮ | ⋮ |
| Door intercom 51 | Voice access | ⋮ | ⋮ |
| | ⋮ | ⋮ | ⋮ |
| ⋮ | ⋮ | ⋮ | ⋮ |

Fig.5

External NAPTR record

| Device type | Service field | URI scheme |
|---|---|---|
| IP telephone | E2U+talk:sip | sip:05012345678info@sip.panasonic.com |
| E-mail | E2U+message:mailto | mailto:AAABBB@panasonic.com |
| Ordinary phone | E2U+talk:tel | tel:+814512345678 |
| I-FAX | E2U+ifax | mailto:ifax@panasonic.com |
| ⋮ | ⋮ | ⋮ |

Fig.11

Can be connected using #050.
(050-1234-5678) Switch?
Y / N

HOME GATEWAY APPARATUS

BACKGROUND OF THE INVENTION

1. Field of the Invention

The present invention relates to a home gateway apparatus that includes and mutually connects a plurality of terminal apparatuses for the home gateway network, e.g., a telephone terminal, fax terminal, etc. (hereafter referred to as internal terminals); and connects to a domain name system server (hereafter referred to as DNS server), the server having a ENUM (tElephone Number Mapping) function that stores and manages a telephone number and various destination information corresponding to the telephone number, and provides a user with the information according to a telephone number used for an inquiry by the user (hereafter referred to as inquiry telephone number).

2. Description of Related Art

In recent years of the rapid IP network service development, various researches have been done around the world, on an ENUM function that enables various applications for communication services (e.g., "IP telephones" including e-mail, telephone call, and Internet telephone call; and "IFAX" including fax and Internet fax) utilizing only a currently used telephone number.

A DNS server having the ENUM function is provided with a table that stores and manages a telephone number and destination information including communication service related to the telephone number (e.g. URI (Uniform Resource Identifier) such as an e-mail address, ordinary telephone number, IP telephone number, fax number and IFAX number). For example, upon receiving notifications of an inquiry telephone number from a terminal apparatus, destination information corresponding to the inquiry telephone number is obtained from the table so that, out of all obtained destination information, the destination information only related to the apparatus type (service function), which is used by the inquiring terminal apparatus, is provided to the terminal apparatus. (c.f. non-patent article 1).

In a management table within a DNS server, a telephone number and various destination information corresponding to the telephone number (URI information) is usually registered by an operation setting of the user, under a permission of a person having the telephone number.

For example, when sending an e-mail from a terminal apparatus to a communication destination, the user of the terminal apparatus inputs the destination telephone number in an e-mail destination field of the e-mail application, while maintaining the e-mail application of the terminal apparatus, and executes a transmission command of the e-mail.

The DNS server, upon-receiving the telephone number and the transmission command from the terminal apparatus, searches the management table for an e-mail address corresponding to the telephone number and returns the obtained e-mail address of the destination to the terminal apparatus.

Upon receiving the e-mail address of the destination from the DNS server, the user of the terminal apparatus can e-mail the destination using the e-mail address.

According to the DNS server having the above described ENUM function, the user of the terminal apparatus can easily obtain the destination information as long as the user has the destination telephone number, even if the user does not have the complete destination information (such as e-mail address or IFAX number of the destination). [Non-patent article 1] Shigeki GOTO et al., "Internet telephone and ENUM" [on-line], Oct. 18, 2002, Japan Network Information Center, [searched on Nov. 25, 2003], Internet <URL: HYPERLINK http://www.nic.ad.jp/ja/materials/after/20021018/ENUM20021018.PDF>

The DNS server having the above-described ENUM function manages a management table that includes destination information related to telephone numbers, the destination information including URI information such as an e-mail address, IP telephone number, and ordinary telephone number of a terminal apparatus. Therefore, as the communication service varies as seen in recent years, the contents of the destination information corresponding to telephone numbers need to be updated more frequently. When each user is responsible for updating the telephone number, the DNS server is accessed more frequently, thereby increasing the workload of the process in the DNS server.

Further, when the DNS server having the ENUM function is utilized, the contents of the management table (registering a telephone number and various destination information related to the telephone number) can be viewed from a terminal apparatus located outside of the network. Therefore, privacy of the user having the telephone number within the management table needs to be protected.

SUMMARY OF THE INVENTION

The present invention addresses the above-described problems. The purpose of the invention is to provide a home gateway apparatus that can largely decrease processing workload of the DNS server by avoiding a direct access to the DNS server from a user, even when there is a change in the contents of the destination information relating to a telephone number.

Another purpose of the present invention is to provide a home gateway apparatus that enables a user to specify which contents of the destination information is for general public access and for internal use only, the destination information being registered in the DNS server for each telephone number, thereby protecting privacy of the user.

In order to attain the above-described purpose, the home gateway apparatus according to the present invention is connected to a DNS server that stores and manages telephone numbers and destination information that includes address information of a plurality of terminal apparatuses corresponding to each telephone number. The home gateway apparatus also includes and mutually connects a plurality of terminal apparatuses for the home gateway network (hereafter referred to as network terminal apparatuses). The home gateway apparatus includes a generator that generates destination information related to the network terminal apparatuses; a memory that stores the destination information generated by the generator; and a self terminal destination information notification unit that notifies the DNS server of the destination information stored in the memory, the destination information being associated with a telephone number of a network terminal apparatus.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 4 briefly illustrates contents of an internal NAPTR record that is stored in an internal NAPTR memory area of the HGW apparatus according to an embodiment of the present invention;

FIG. 5 briefly illustrates contents of an external NAPTR record that is stored in an external NAPTR memory area of the HGW apparatus according to an embodiment of the present invention;

FIG. 11 generally illustrates messages generated when a telephone call is placed from the internal terminal according to the embodiment of the present invention.

DETAILED DESCRIPTION OF PREFERRED EMBODIMENTS

Figure 1:
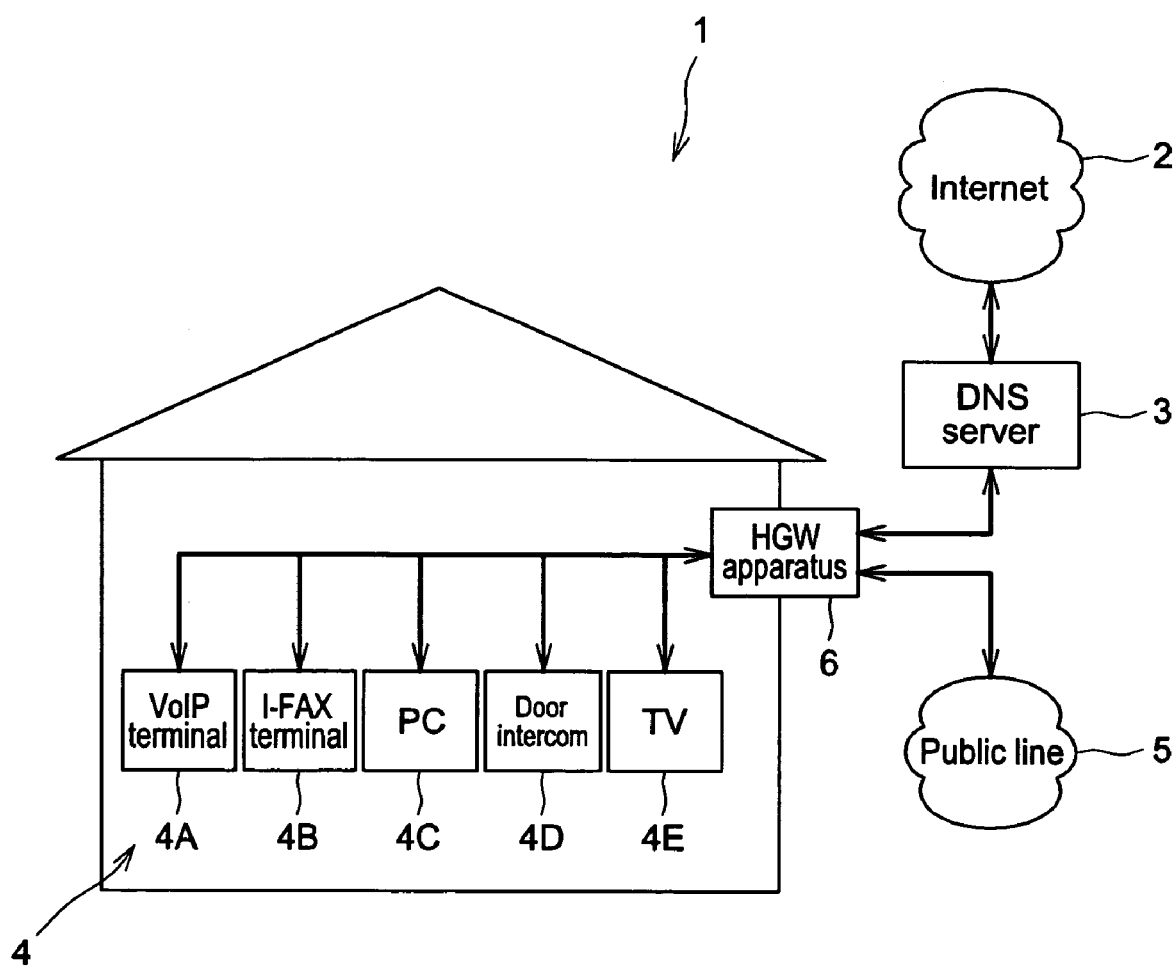
FIG. 1 is a block diagram illustrating a general internal configuration of an HGW (Home GateWay) system according to an embodiment on the present invention.

The embodiment of the present invention is explained, as an HGW (Home GateWay) system, in the following, in reference to the above-described drawings. FIG. 1 is a block diagram illustrating a general configuration of an internal HGW system according to the embodiment of the present invention.

As shown in FIG. 1, HGW system 1 includes Internet 2, DNS server 3 that stores and manages telephone numbers corresponding various destination information (NAPTR: naming authority pointer record); a plurality of internal terminals 4 that are located inside a home (e.g. VoIP terminal, IFAX terminal); and HGW apparatus 6 that manages and connects to the plurality of internal terminals 4, and connects to public line 5 and DNS server 3.

The plurality of internal terminals 4 include, for example, VoIP terminal 4A that has an ordinary telephone and IP telephone service functions; IFAX terminal 4B that has ordinary fax and IFAX service functions; PC terminal 4C that executes various settings; door intercom 4D; and TV 4E. Although not shown in the figure, the internal terminals 4 also include an ordinary telephone terminal that only has the normal telephone service function, and an ordinary fax terminal that only has the normal fax service function.

HGW apparatus 6 connects to internal terminals 4 via the LAN, and manages the plurality of internal terminals 4 by assigning an internal extension number (extension number) to each terminal. The detail of the above is described later.

Figure 2:
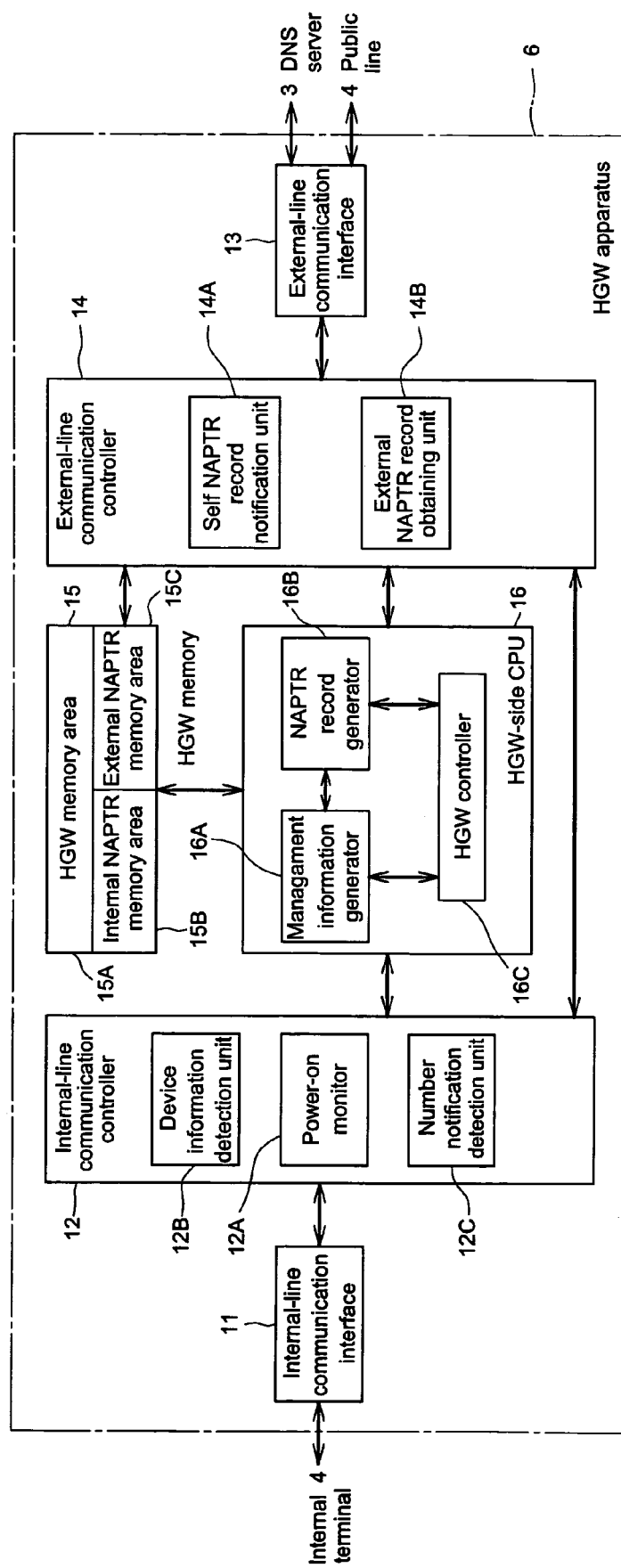
FIG. 2 is a block diagram illustrating a general internal configuration of an HGW apparatus according to the embodiment of the present invention.

FIG. 2 is a block diagram illustrating a general internal configuration of HGW apparatus 6.

As shown in FIG. 2, an HGW apparatus 6 includes internal-line connection interface 11 that connects to internal terminals 4; internal-line communication controller 12 that controls the communication with internal terminals 4; external-line communication interface 13 that connects to DNS server 3 and public line 5; external-line communication controller 14 that controls communication with the DNS server 3 and public line 5; HGW memory area 15 that stores and manages various information related to HGW apparatus 6; and HGW-side CPU 16 that controls the entire HGW apparatus 6.

Internal-line communication controller 12 is a unit that controls the communication with internal terminals 4, the controller including power-on monitor 12A that monitors ON/OFF (power status) of each internal terminal 4; device information detection unit 12B that obtains, from the internal terminal 4, the device information (of internal terminal 4) relating to the power-on status, when power-on monitor 12A detects the power-on status of internal terminal 4; number notification detection unit 12C that detects a telephone number notification (extension number notification) in response to an inquiry from internal terminal 4.

HGW-side CPU 16 is a unit that controls the entire HGW apparatus 6, having management information generator 16A that generates management information of internal terminal 4; NAPTR record generator 16B that generates a NAPTR record based on all of the management information of all internal terminals 4, the information being generated by management information generator 16A and; HGW controller 16C that updates the memory of NAPTR record in HGW memory 15 and performs various control operations of HGW-side CPU 16.

The management information of internal terminal 4 includes a service field that descries service functions of a corresponding internal terminal 4 (by device type or function type); and URI scheme that describes URI specifying destination of the internal terminal 4 or function command, each information separately registered for each internal terminal 4 (which is later described in detail.) Based on such information, extension number, IP address, and URI information can be identified.

An NAPTR record includes an internal NAPTR record and an external NAPTR record. The internal NAPTR record is data including all management information related to internal terminals 4 managed by HGW apparatus 6, while the external NAPTR record is data, within the internal NAPTR record, including management information relating to internal terminals 4 that are allowed to be publicly disclosed to an outsider (DNS server 3) other than HGW apparatus 6.

HGW memory 15 includes HGW memory area 15A that stores various information related to HGW apparatus 6; internal NAPTR memory area 15B that stores and manages internal NAPTR record for the internal management; external NAPTR memory area 15C that stores and manages external NAPTR record to be disclosed externally.

External-line communication controller 14 includes self NAPTR record notification unit 14A that notifies DNS server 3, at a predetermined timing, of the external NAPTR record that is already registered in the external NAPTR memory area 15C. External-line communication controller 14 also includes external NAPTR record obtaining unit 14B that obtains external NAPTR record from the DNS server, the record corresponding to the inquiry telephone number given by internal terminal 4, and notifies internal terminal 4, through internal-line communication controller 12, of the requested external NAPTR record. In addition, DNS server 3 updates the registration of the external NAPTR record corresponding to the telephone number, when receiving the external NAPTR record from self NAPTR record notification unit 14A.

Figure 3:
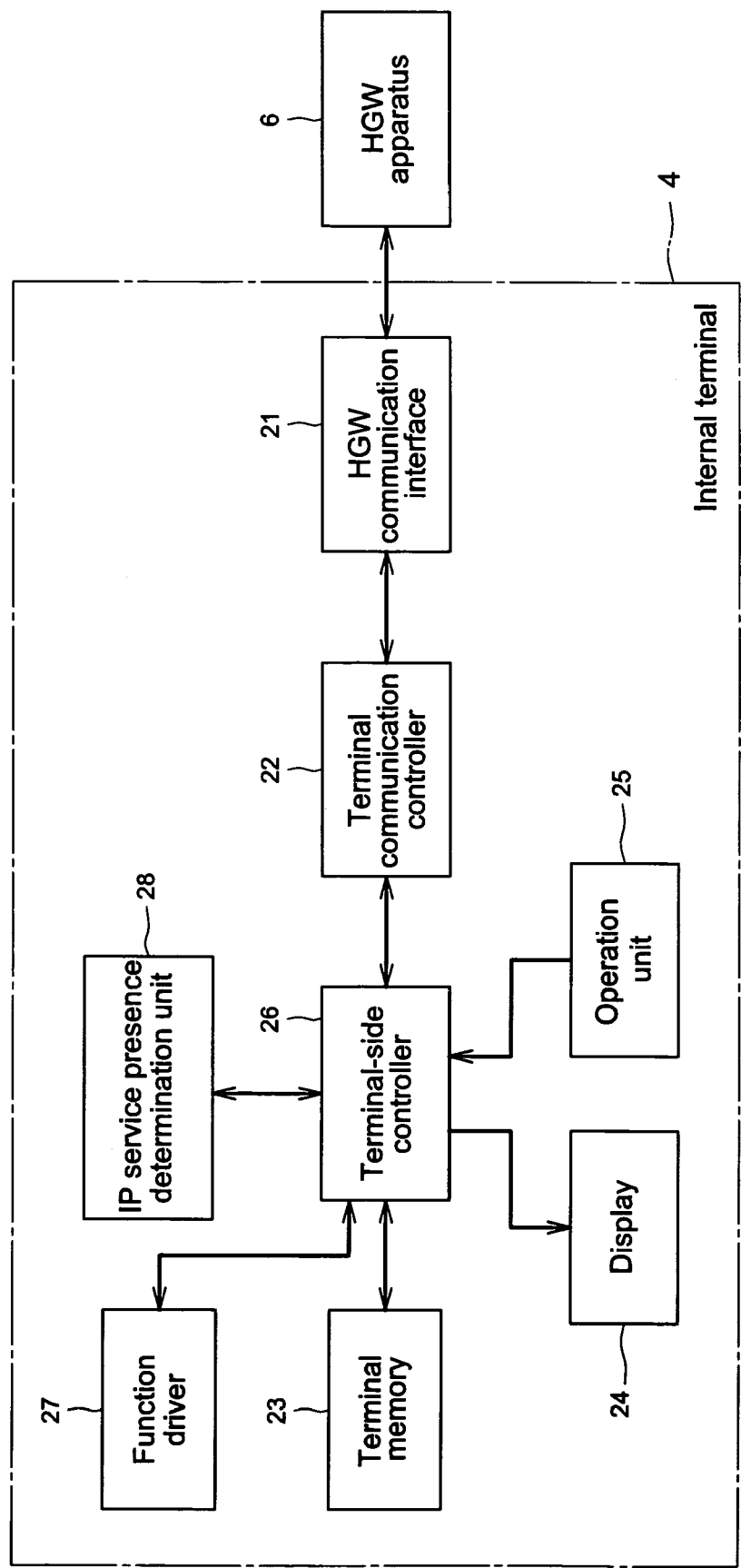
FIG. 3 is a block diagram illustrating an internal configuration of the terminal apparatus managed by the HGW apparatus according to the embodiment of the present invention.

FIG. 3 is a block diagram illustrating a general configuration of internal terminal 4.

As shown in FIG. 3, internal terminal 4 includes HGW communication interface 21 that interfaces with HGW apparatus 6; terminal communication controller 22 that controls communication with HGW apparatus 6 via HGW communication interface 21; terminal memory 23 that stores various information; display 24 that displays various information; operation unit 25 that inputs various commands; terminal-side controller 26 that controls the entire internal terminal 4; function driver 27 that executes function services according to the apparatus type of internal terminal 4; and IP service presence determination unit 28 that obtains the external NAPTR record (according to the inquiry telephone number) via HGW communication interface 21, and determines whether that obtained NAPTR record has an IP service function identical to the function of its own apparatus.

For the purpose of illustration, function driver 27 is described in the embodiment in order to avoid the redundant description. When internal terminal 4 is VoIP terminal 4A, function driver 27 is a driver specific to VoIP terminal 4A and related to the IP telephone service function. When internal terminal 4 is IFAX terminal 4B, function driver 27 is a driver specific to IFAX terminal 4B and related to the IFAX service function.

FIG. 4 briefly illustrates contents of internal NAPTR record that is stored in internal NAPTR memory area 15B.

Internal NAPTR record includes data including management information of all internal terminals 4 managed by HGW apparatus 6. The management information includes service field that illustrates service function (apparatus type or function type) for each internal terminal 4, and URI scheme that illustrates URI to specify destination of each internal terminal 4 or function command. In addition, the apparatus type for internal terminals 4 can be, for example, VoIP terminal (E2U+talk:sip), ordinary telephone terminal (E2U+talk:tel), IFAX terminal (E2U+talk:ifax), ordinary fax terminal, door intercom, or TV, thereby separated by the types of each terminal. The function type can be, in case of TV, for example, configuration types such as voice access and image transmission request that use the function command.

In this example, the internal NAPTR record is described in table format, as shown in FIG. 4. However, in the actual configuration, internal NAPTR record is data that lists only a service field and URI scheme.

FIG. 5 briefly illustrates contents of the external NAPTR record that is stored in external NAPTR memory area 15C.

The external NAPTR record is a portion of the internal NAPTR record that is allowed to become public to the external device (DNS server 3), the internal NAPTR record being related to all internal terminals 4 managed by HGW apparatus 6. The external NAPTR record is configured with a service field (illustrating the available service type (by device type) corresponding to the telephone number managed by HGW apparatus 6) and a URI scheme (specifying destination by the above device type). For the purpose of illustration, the external NAPTR record is illustrated in a table format as shown in FIG. 5. However, the actual external NAPTR record just lists service fields and URI schemes.

Furthermore, "self terminal apparatus" in the claims is internal terminal 4; "home gateway apparatus" is HGW apparatus 6; "generator" is either management information generator 16A or NAPTR record generator 16B; "self terminal destination information notification unit" is self NAPTR record notification unit 14A; "inquiry information obtaining unit" and "inquiry information notification unit" are external NAPTR record obtaining unit 14B; "power-on monitor unit" is power-on monitor 12A; "device information detection unit" is device information detection unit 12B; and "prohibition specification unit" is an specification operation of PC terminal 4C.

Figure 6:
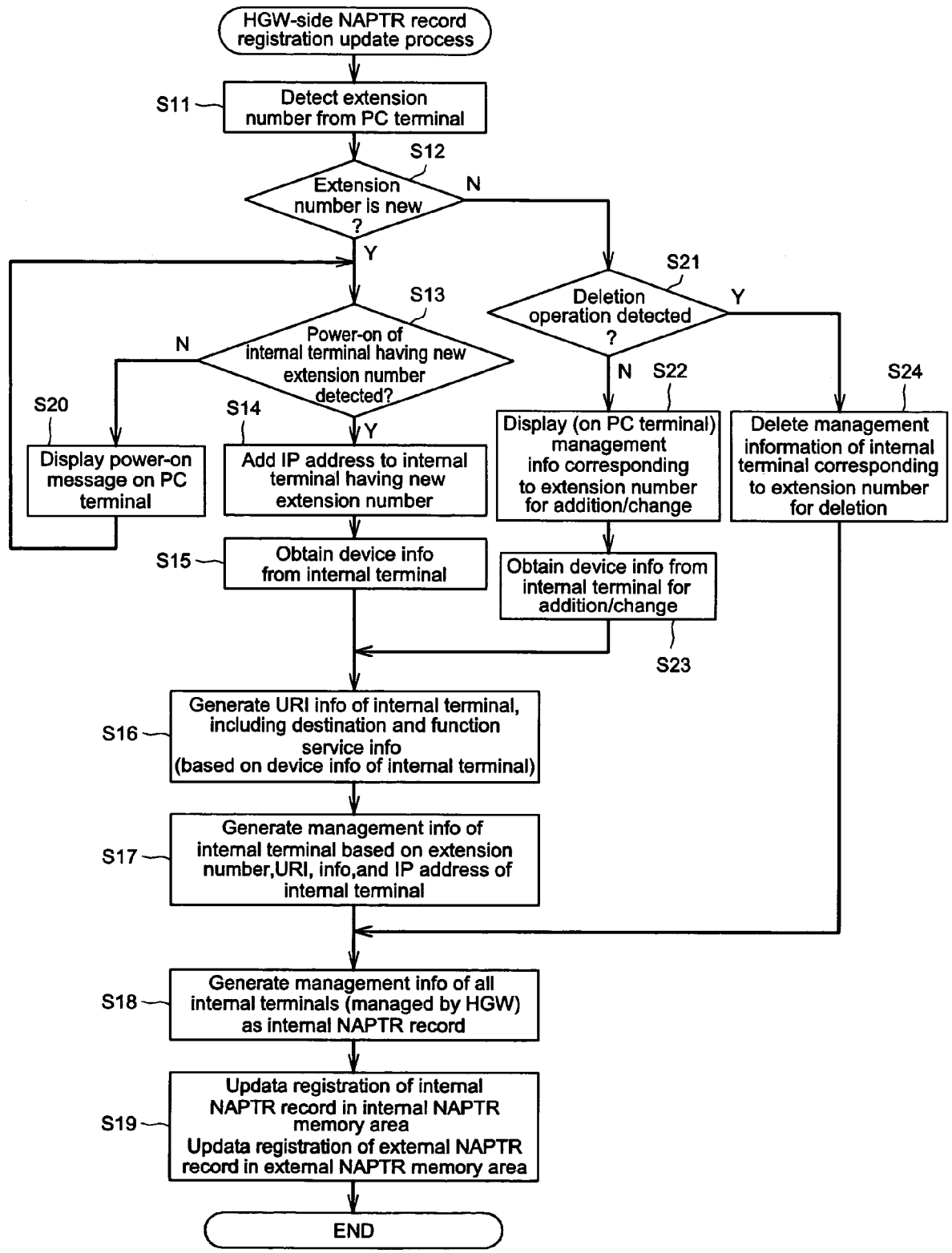
FIG. 6 is a flowchart illustrating an operation of a CPU at the HGW side, in relation to the HGW apparatus that updates the registration of an NAPTR record at the HGW side according to the embodiment of the present invention.

The following description illustrates the operation of HGW system 1 according to an embodiment of the present invention. FIG. 6 is a flowchart illustrating the operation of HGW-side CPU 16 within HGW apparatus 6, the operation being related to the registration update process of the HGW-side NAPTR record.

The registration update process of the HGW-side NAPTR record (shown in FIG. 6) is a process, following the changes in information of internal terminals 4 (e.g., management information), that updates registration of the NAPTR record stored in HGW memory 15 within HGW apparatus 6.

When the user of an internal terminal 4 updates the registration of the NAPTR record contents, the user must first access HGW apparatus 6 through PC terminal 4C.

In FIG. 6, HGW-side CPU 16 of HGW apparatus 6 detects, through internal-line communication interface 11 and internal-line communication controller 12, an input of an extension number from PC terminal 4C, the terminal accessing for communication (step S11).

Upon detecting the extension number, HGW-side CPU 16 determines whether the extension number is new, based on the internal NAPTR record that is stored in the internal NAPTR memory area 15B (step S12). The URI scheme of the internal NAPTR record includes the extension number of internal terminal 4 that is managed by HGW apparatus 6.

When determining that the extension number input by PC terminal 4C is new, HGW-side CPU 16 determines, through power-on monitor 12A of internal-line communication controller 12, whether the power-on of internal terminal 4 (having the new number) is detected (step S13).

CPU 16, when detecting the power-on of internal terminal 4, having the new extension number, adds an IP address to the internal terminal 4 when the power is turned ON (step S14). The IP address is automatically added to the powered-on internal terminal 4, using the DHCP function.

Management information generator 16A of HGW-side CPU 16 obtains (through device information detection unit 12B of internal-line communication controller 12) device information including service function (by device type or function type), and a destination or a function command from the internal terminal 4 (step S15).

Based on the extension number, IP address, and device information related to the new internal terminal 4, management information generator 16A generates URI information that is configured with a service field (illustrating the service function, by device type or function type of internal terminal 4) and a URI scheme (specifying destination or function command related to the device of internal terminal 4) (step S16). In addition, the service function and function command is considered as the function service information.

Management information generator 16A generates management information of the new internal terminal 4 based on the extension number, IP address, and URI information related to the internal terminal 4 (step S17).

Upon generating management information of internal terminal 4 using management information generator 16A, NAPTR record generator 16B generates internal NAPTR record based on all management information related to all internal terminals 4 that are managed by HGW apparatus 6 (step S18). NAPTR record generator 16B also updates the registration of the internal NAPTR record in internal NAPTR memory area 15B, and updates the registration of the external NAPTR record in external NAPTR memory area 15C (step S19), the external NAPTR record being a portion of the internal NAPTR record that is allowed to become public to the external device (DNS server 3). Then, the operational process is terminated.

HGW-side CPU 16 specifies, within the internal NAPTR record, the external NAPTR record to be allowed to become public to the external device, based on the operation specified from PC terminal 4C, and updates the registration of the external NAPTR record in external NAPTR memory area 15C.

When HGW-side CPU 16 does not detect a power-on of the internal terminal 4 (having the new extension number) at step S13, HGW-side CPU 16 displays a message prompting the power-on of the same internal terminal 4 on the display screen of PC terminal 4C (step S20). Then, the control moves to step S13 in order to monitor whether the power is turned ON.

When HGW-side CPU 16 determines the extension number is not new at step S12, HGW-side CPU 16 determines whether it detects a deletion (from PC terminal 4C) of the management information that is already registered in the internal NAPTR record (step S21).

When HGW-side CPU 16 does not detect a deletion from PC terminal 4C, HGW-side CPU 16 determines that the input extension number (detected at step S11) is an input of an extension number to be added/modified. Then, HGW-side CPU 16 displays, on the display screen of PC terminal 4C, the management information of the internal terminal 4 related to the extension number (for addition/modification) (step S22), and obtains the device information of the same internal terminal 4 through device information detection unit 12B (step 23). Then, the control moves to step S16 in order to generate new management information of the internal terminal 4.

Upon detecting the deletion from PC terminal 4C at step S21, management information generator 16A (of HGW-side CPU 16) determines that the extension number input detected at step S11 is the extension number to be deleted. Therefore, management information of the internal terminal 4 (related to the extension number for deletion) is deleted from the internal NAPTR record stored in internal NAPTR memory area 15B (step S24). Then, the control moves to step S18 in order to generate a new internal NAPTR record after the management information of the internal terminal 4 is deleted.

According to the HGW-side NAPTR record registration updating process shown in FIG. 6, HGW apparatus 6 is provided with management information including URI information that is configured with a service field (indicating the service type of all internal terminals 4 under the management, by device type or function type) and a URI scheme (specifying a destination or function command). HGW apparatus 6 is also provided with an internal NAPTR record based on the entire management information of all internal terminals 4, in order to update the registration of the internal NAPTR record in internal NAPTR memory area 15B. Therefore, HGW apparatus 6 can store and manage the internal NAPTR record including the destinations and function commands of all internal terminals 4 that are managed by HGW apparatus 6.

Further, according to the registration updating process of the HGW-side NAPTR record, the external NAPTR record is generated, within the internal NAPTR record managed by HGW apparatus 6, the record being allowed to be public to DNS server 3, in order to update the registration of the generated external NAPTR record in external NAPTR memory area 15C. Therefore, according to the user setup operation, it is possible to specify the internal NAPTR record and the external NAPTR record for securing the user privacy protection.

Figure 7:
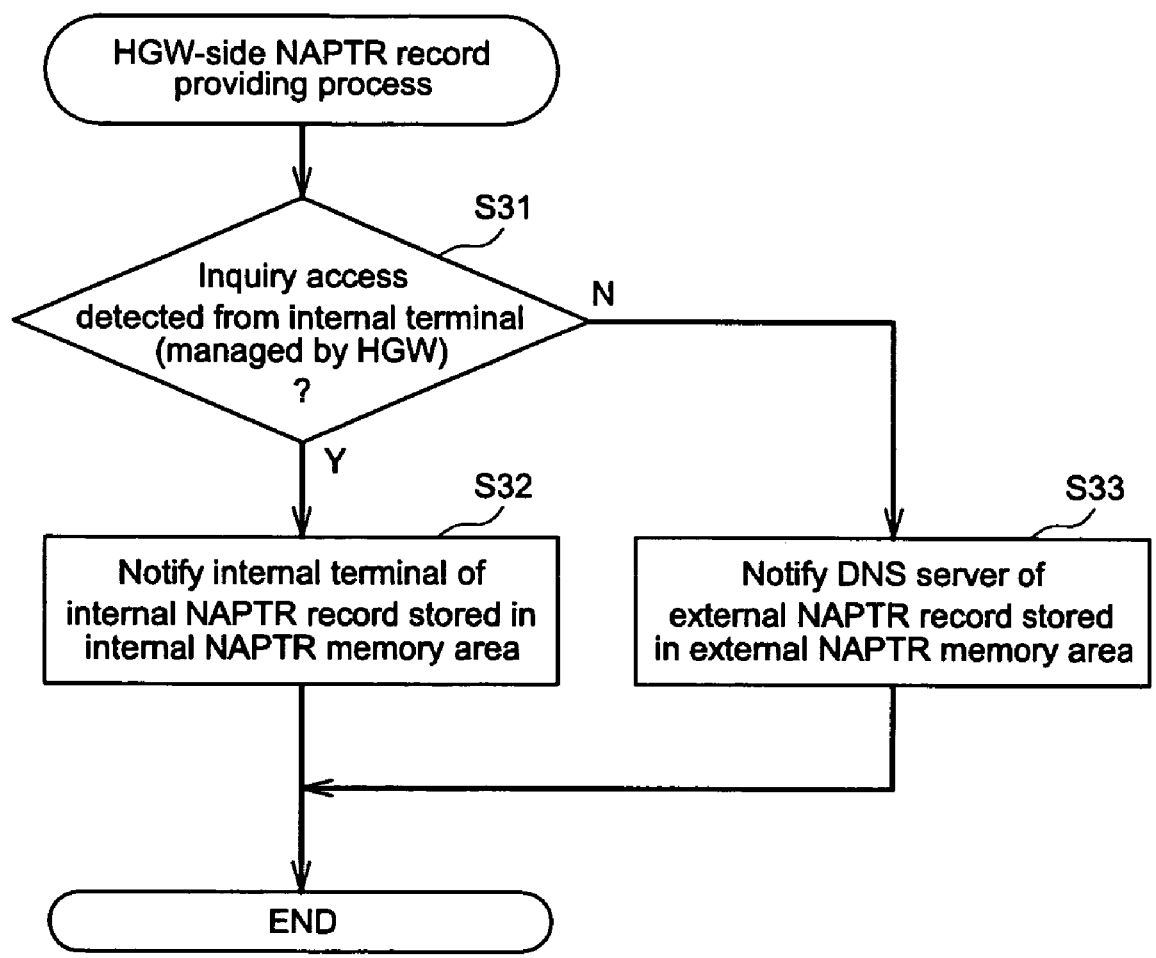
FIG. 7 is a flowchart illustrating an operation of the CPU at the HGW side, in relation to an HGW apparatus that provides the NAPTR record at the HGW side according to the embodiment of the present invention.

FIG. 7 is a flowchart illustrating the operational process of HGW-side CPU 16 of HGW apparatus 6, the process relating to an HGW-side NAPTR record providing process.

The HGW-side NAPTR record providing process shown in FIG. 7 is a process that provides the registered NAPTR record to HGW memory 15, according to an inquiry from internal terminal 4 or DNS servers 3.

In FIG. 7, HGW controller 16C of HGW-side CPU 16 determines whether it detects an inquiry access from internal terminal 4 through internal-line communication controller 12 (step S31).

When detecting an inquiry access from internal terminal 4, HGW controller 16C reads out an internal NAPTR record stored in internal NAPTR memory area 15B, and notifies the inquiring internal terminal 4 of the internal NAPTR record (step S32). Then, the operational process is terminated.

When the inquiry access detected by self NAPTR record notification unit 14A (of the HGW controller 16C) is not from internal terminal 4 at step S31, self NAPTR notification unit 14A determines that the inquiry access is from DNS server 3 (through external-line communication controller 14A). Therefore, the external NAPTR record that is stored in external NAPTR memory area 15C is read out, DNS server 3 is notified of the external NAPTR record (step S33). Then, the operational process is terminated.

According to the HGW-side NAPTR record providing process shown in FIG. 7, when an inquiry access from internal terminal 4 is detected, internal terminal 4 is notified of the internal NAPTR record that is stored in internal NAPTR memory area 15B. However, when an inquiry access from DNS server 3 is detected, the DNS server 3 is notified of the external NAPTR record that is stored in external NAPTR memory area 15C. Accordingly, since the NAPTR record is provided differently depending on where the inquiry is generated from (e.g. internal terminal 4 or DNS server 3), the user privacy is protected even when the information becomes public.

In addition, according to the HGW-side NAPTR record providing process shown in FIG. 7, the illustration was based on providing the NAPTR record when there is a communication access to HGW apparatus 6 from internal terminal 4 or DNS server 3. However, even when there is no communication access from DNS server 3, for example, self NAPTR record notification unit 14A can automatically notify the DNS server 3 of the external NAPTR record, when there is a registration update of the external NAPTR record (stored in external NAPTR memory area 15C).

Figure 8:
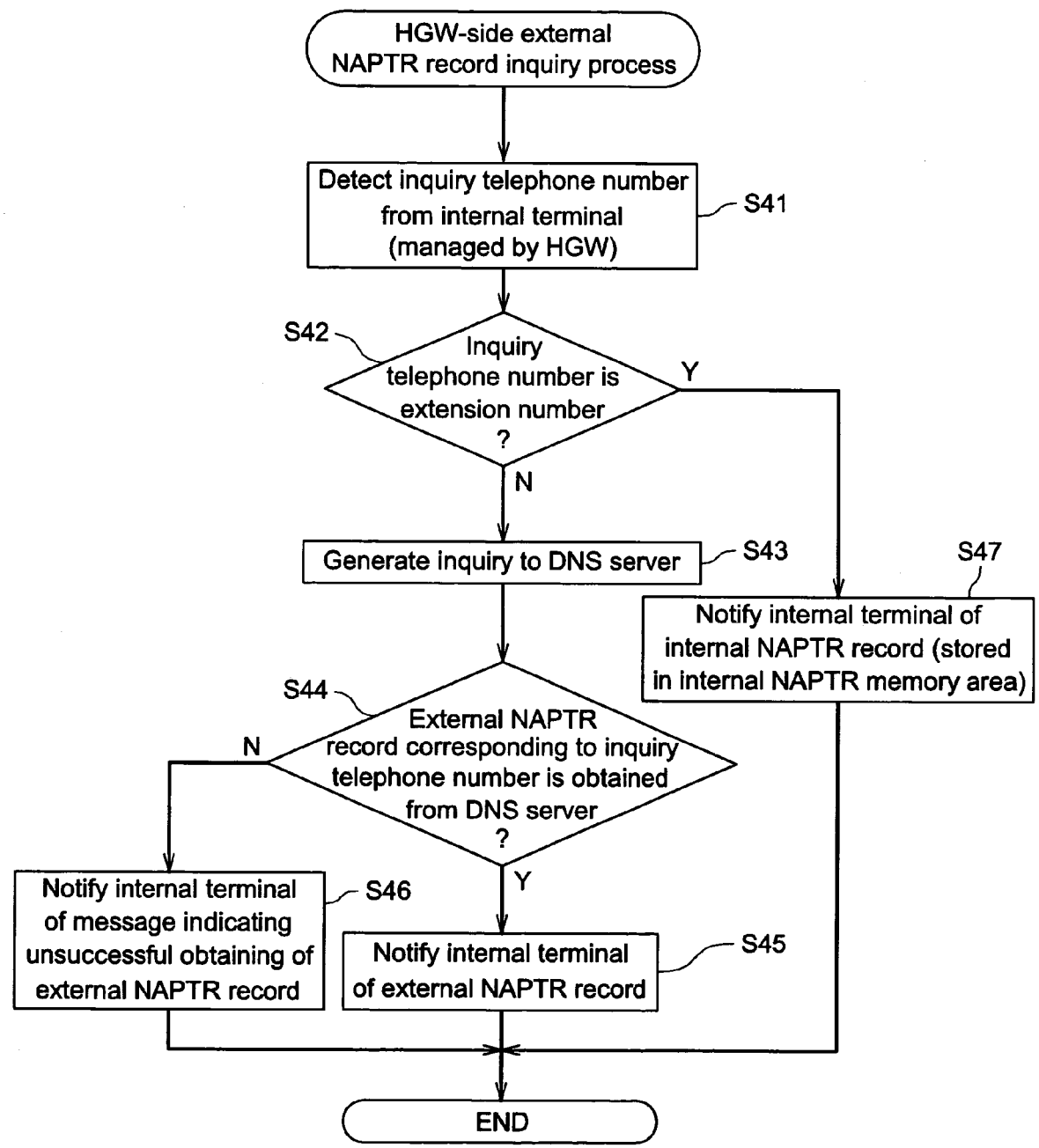
FIG. 8 is a flowchart illustrating an operation of the CPU at the HGW side, in relation to the HGW apparatus that generates an inquiry for an external NAPTR record at the HGW side according to the embodiment of the present invention.

FIG. 8 is a flowchart illustrating an operational process of HGW-side CPU 16 of HGW apparatus 6, the process relating to an inquiry process of the HGW-side external NAPTR record.

The inquiry process of the HGW-side external NAPTR record shown in FIG. 8 is a process that includes detecting an inquiry number from internal terminal 4; notifying internal terminal 4 (when the inquiry number is an extension number) of the internal NAPTR record having the extension number; making an inquiry to DNS server 3 (when the inquiry number is a telephone number (external-line number)) for the external NAPTR record corresponding to the telephone number; and notifying internal terminal 4 of the NAPTR record corresponding to the telephone number (obtained from DNS server 3).

In FIG. 8, upon detecting the inquiry telephone number from internal terminal 4 through internal-line communication controller 12 (the number being managed in HGW apparatus 6) (step S41), HGW controller 16C of HGW-side CPU 16 determines whether the telephone number is an extension number (step S42).

When determining that the inquiry telephone number is not an extension number, HGW controller 16C determines that the telephone number is an external-line number and generates an inquiry to DNS server 3, through external NAPTR record obtaining unit 14B of external-line communication controller 14, to obtain the external NAPTR record corresponding to the telephone number (step S43). In addition, DNS server 3 stores and manages the external NAPTR record for each telephone number.

External NAPTR record obtaining unit 14B determines whether the external NAPTR record corresponding to the inquiry telephone number is obtained from DNS server 3 (step S44).

When determining that the external NAPTR record is obtained from DNS server 3, the record been corresponding to the inquiry telephone number, external NAPTR record obtaining unit 14B notifies internal terminal 4 (inquiry generator) of the obtained external NAPTR record, through internal-line communication controller 12 (step S45). Then, the operational process is terminated. Accordingly, internal terminal 4 can obtain the external NAPTR record corresponding to the inquiry telephone number.

When determining that the external NAPTR record cannot be obtained from DNS server 3 at step S44, the record corresponding to the inquiry telephone number, external NAPTR record obtaining unit 14B notifies internal terminal 4 (inquiry generator), through internal-line communication controller 12A, of a message that the external NAPTR record cannot be obtained (step S46). Then, the operational process is terminated. Therefore, internal terminal 4 is not able to obtain the external NAPTR record corresponding to the inquiry telephone number.

When determining that the inquiry telephone number is an extension number at step S42, HGW controller 16C notifies internal terminal 4 (inquiry generator) of the internal NAPTR record stored in internal NAPTR memory area 15B (step S47). Then, the operational process is terminated. Accordingly, internal terminal 4 is able to obtain the internal NAPTR record.

According to the HGW-side external NAPTR record inquiry process shown in FIG. 8, when detecting an inquiry extension number from internal terminal 4, the internal terminal 4 is notified of the internal NAPTR record that is stored in internal NAPTR memory area 15B. At the same time, when detecting an inquiry telephone number (external-line number) from internal terminal 4, the external NAPTR record corresponding to the telephone number is searched for and obtained from DNS server 3, so that the internal terminal 4 (inquiry generator) is notified of the obtained external NAPTR record. Accordingly, the user of internal terminal 4 is able to obtain an internal NAPTR record corresponding to an extension number, and an external NAPTR record corresponding to a telephone number (external-line number), with a simple operation.

Figure 9:
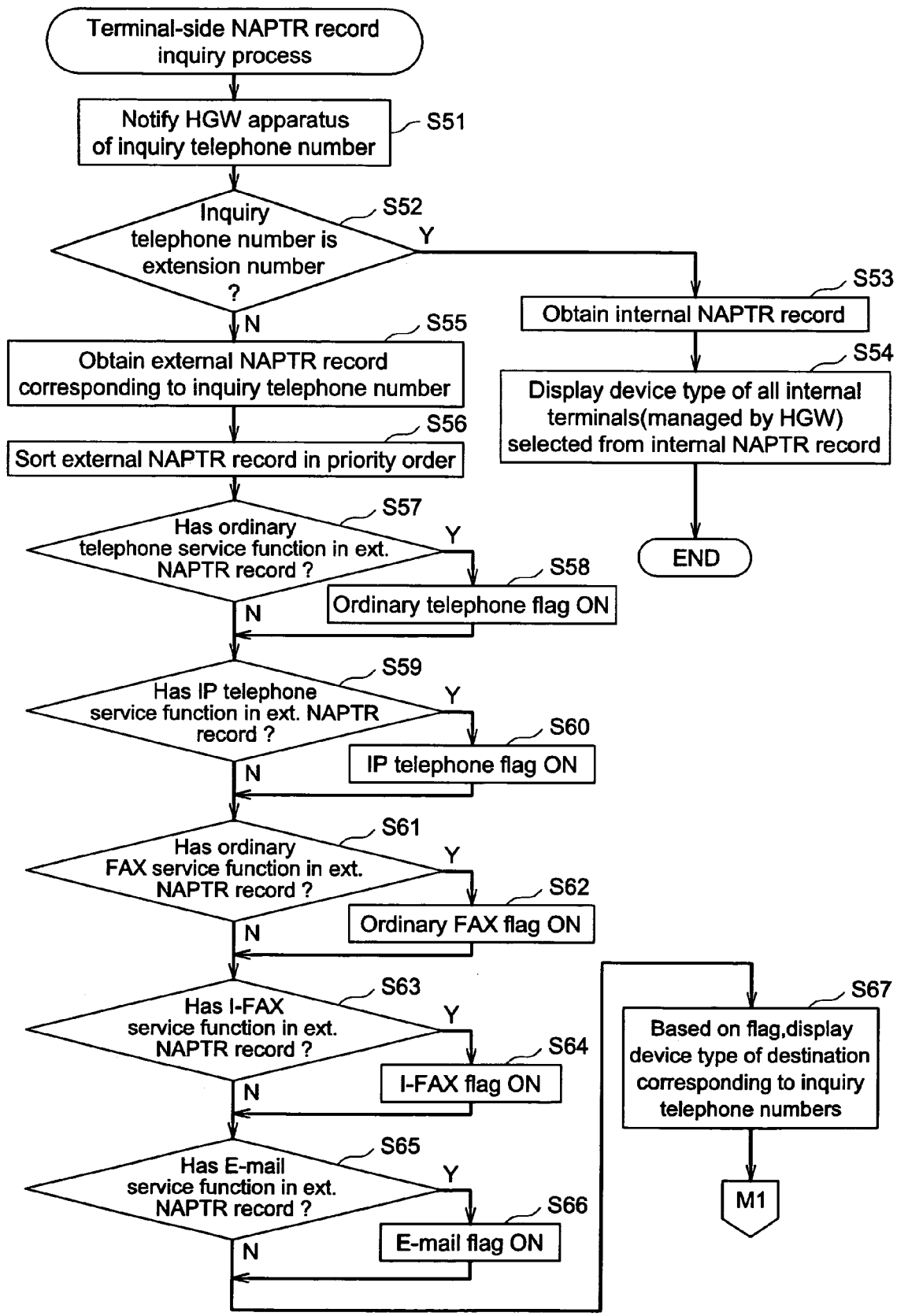
FIG. 9 is a flowchart illustrating an operation of a controller at the terminal side, in relation to an internal terminal that generates an inquiry for the NAPTR record of the terminal side according to the embodiment of the present invention.
Figure 10:
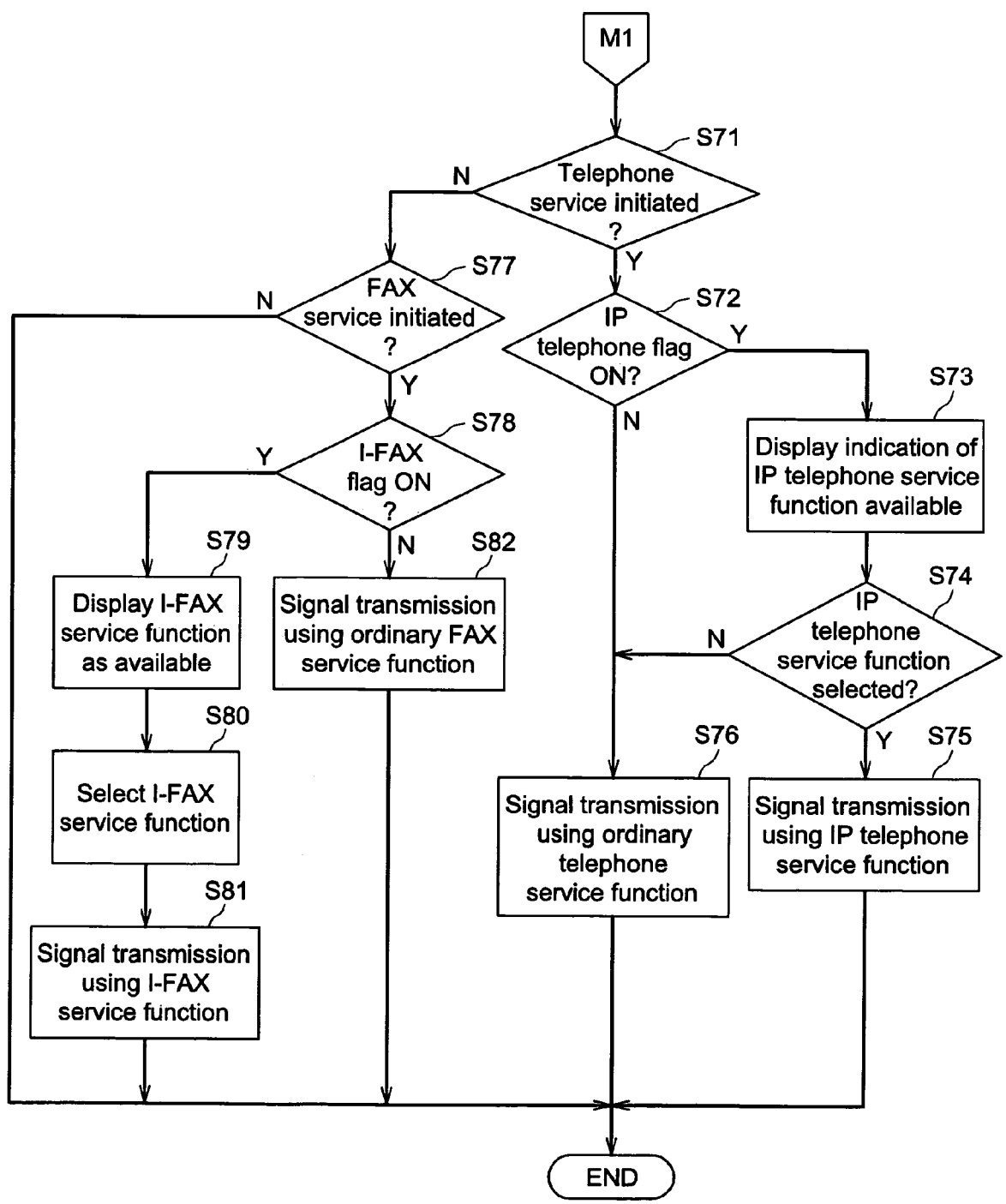
FIG. 10 is a flowchart illustrating an operation of the controller at the terminal side, in relation to the internal terminal that generates an inquiry for the NAPTR record of the terminal side according to the embodiment of the present invention.

FIGS. 9 and 10 are flowcharts illustrating an operational process of terminal-side controller 26 of internal terminal 4, the process relating to a terminal-side NAPTR record inquiry process.

The terminal-side NAPTR record inquiry process shown in FIGS. 9 and 10 includes various types of operations of internal terminal 4 after the requested NAPTR record is obtained from HGW apparatus 6.

In FIG. 9, upon detecting an inquiry telephone number input, terminal-side controller 26 of internal terminal 4 notifies HGW apparatus 6 of the inquiry telephone number, through HGW communication interface 21 (step S51).

Terminal-side controller 26 determines whether the inquiry telephone number is an extension number (step S52).

When determining that the inquiry telephone number is an extension number, terminal-side controller 26 obtains, from HGW apparatus 6, an internal NAPTR record stored in internal NAPTR memory area 15B (step S53), and enables display 24 to display all service functions (either by device type or function type) of internal terminals 4, the functions being selected from the obtained internal NAPTR records (step S54). Then, the operational process is terminated. Accordingly, the user of the internal terminal 4 views the service functions (by device type or function type) displayed on display 26, and visually recognize the service functions (by device type or function type) of all internal terminals 4.

When determining that the inquiry telephone number is not an extension number at step S52, terminal-side controller 26 determines that the telephone number is an external-line number and obtains, from DNS server 3, an external NAPTR record corresponding to the inquiry telephone number via HGW apparatus 6 (step S55). Additionally, external NAPTR record includes device type information (service field) and destination (URI scheme) that correspond to the inquiry telephone number, as shown in FIG. 5.

Upon obtaining the external NAPTR record corresponding to the inquiry telephone number at step S55, terminal-side controller 26 sorts the device types (within the external NAPTR record) in a predetermined priority order of the service functions used by internal terminal 4 (step S56). In particular, the priority order of the service functions is a service function order for the use by internal terminal 4. For example, when internal terminal 4 has service functions of ordinary telephone, IP telephone, ordinary fax, and IFAX functions, the user can set the priority order, for example, 1) ordinary telephone; 2) IP telephone; 3) ordinary fax; and 4) IFAX functions. In addition, the sorting process for the priority order at step S56 (sorting the service functions within the obtained external NAPTR record, in the priority order) allows a smooth execution of an identification operation for the service function following the sorting process.

Next, terminal-side controller 26 determines whether the external NAPTR record has a service function of the ordinary telephone (E2U+talk:tel) (step S57). The determination of the presence of a service function is made based on the service field of the external NAPTR record.

When determining that the external NAPTR record has the ordinary telephone service function, it is determined that the communication destination has the ordinary telephone service function. Thus, an ordinary telephone flag is turned ON (step S58). Next, it is determined whether the external NAPTR record has a service function of an IP telephone (E2U+talk:sip) (step S59).

When determining that the external NAPTR record has the IP telephone service function, terminal-side controller 26 determines that the communication destination has the IP telephone service function. Thus, an IP telephone flag is turned ON (step S60). Next, it is determined whether the external NAPTR record has a service function of an ordinary fax (E2U+fax:tel) (step S61).

When determining that the external NAPTR record has the ordinary fax service function, terminal-side controller 26 determines that the communication destination has the ordinary fax service function. Thus, an ordinary fax flag is turned ON (step S62). Next, it is determined whether the external NAPTR record has a service function of an IFAX (E2U+ifax) (step S63).

When determining that the external NAPTR record has the IFAX service function, terminal-side controller 26 determines that the communication destination has the IFAX service function. Thus, an IFAX flag is turned ON (step S64). Next, it is determined whether the external NAPTR record has a service function of e-mail (E2U+email:mailto) (step S65).

When determining that the external NAPTR record has the e-mail service function, terminal-side controller 26 determines that the communication destination has the e-mail service function. Thus, an e-mail flag is turned ON (step S66). Next, the service functions of the communication destination (corresponding to the inquiry telephone number) based on the ON/OFF mark of each flag are displayed on display 24, as shown in FIG. 12(*a*) (step S67). Then, the control moves to M1 shown in FIG. 10. Additionally, FIG. 12(*a*) illustrates an example where the ordinary telephone flag is turned ON, the IP telephone flag is turned ON, the ordinary fax flag is turned ON, the IFAX flag is turned ON, and the e-mail flag is turned OFF (i.e., the communication destination has service functions for the ordinary telephone, ordinary fax, IFAX, and IP telephone).

When it is determined that the external NAPTR record does not have the service function of the ordinary telephone at step S57, terminal-side controller 26 leaves the ordinary telephone flag "OFF". Then, the control moves to step S59.

When it is determined that the external NAPTR record does not have the service function of the IP telephone at step S57, terminal-side controller 26 leaves the IP telephone flag "OFF". Then, the control moves to step S61.

When it is determined that the external NAPTR record does not have the service function of the ordinary fax at step S61, terminal-side controller 26 leaves the ordinary fax flag "OFF". Then, the control moves to step S63.

When it is determined that the external NAPTR record does not have the service function of the IFAX at step S63, terminal-side controller 26 leaves the IFAX flag "OFF". Then, the control moves to step S65.

When it is determined that the external NAPTR record does not have the service function of the e-mail service at step S65, terminal-side controller 26 leaves the e-mail flag "OFF". Then, the control moves to step S67.

In addition, internal terminal 4, shown as an example in FIG. 9, has service functions of ordinary telephone, IP telephone, ordinary fax, IFAX, and e-mail and executes a determination process of steps S57, S59, S61, S63, and S65. However, when internal terminal 4 only has service functions of ordinary telephone and IP telephone, for example, internal terminal 4 only executes the process of determining whether the external NAPTR record has the ordinary telephone and IP telephone service functions, and the process of setting the flags for IP telephone and moderate telephone. Therefore, the processing steps from S61 to S66 are not necessary. Accordingly, the service functions are displayed on display 24, based on the ON/OFF state of the ordinary telephone flag and IP telephone flag.

Starting from M1 shown in FIG. 10, terminal-side controller 26 determines whether what is initiated at internal terminal 4 is the telephone service function (step S71). In this embodiment, "what is initiated" is a first service function used when internal terminal 4 is being used. In this example, the first service function is set by a user.

When it is determined what is initiated is a telephone service function, terminal-side controller 26 determines, through IP service presence determination unit 28, whether the IP telephone flag is ON (step S72).

When determining that the IP telephone flag is ON, terminal-side controller 26 enables display 24 to display a message indicating that the IP telephone service function is available, as shown in FIG. 11 (step S73), and determines whether a selection for the IP telephone service function is detected within a predetermined time period (step S74). When the user of internal terminal 4 views "050" (the message indicating that the IP telephone service function can be used), the user can recognize that the communication destination has the IP telephone service function.

When detecting the selection for the IP telephone service function within a predetermined time period, terminal-side controller 26 executes a signal transmission to the communication destination for this communication (e.g., sip: 05012345678info @sip.panasonic.com), using the IP telephone service function (step S75). Then, the operational process is terminated. Accordingly, the user of internal terminal 4 can accomplish the execution of signal transmission using the IP telephone service function.

When determining that the IP telephone flag is not ON at step S72, terminal-side controller 26 executes a signal transmission to the communication destination using the ordinary telephone service function (e.g., sip:tel:+814512345678) (step S76). Then, the operation process is terminated. Accordingly, the user of internal terminal 4 can accomplish the execution of signal transmission using an ordinary telephone service function, viewing the displayed contents as shown in FIG. 12(*b*). Similarly, when fax function is selected as shown in FIG. 12(*c*), a signal transmission using the ordinary fax service function is executed.

When terminal-side controller 26 does not detect a selection for the IP telephone service function within a predetermine time period at step S74, the control moves to step S76 to allow the use of an ordinary telephone service function.

When determining that what is initiated at step S71 is not a telephone service function, terminal-side controller 26 determines whether what is initiated is the fax service function (step S77).

When it is determined that what is initiated is the fax service function, terminal-side controller 26 determines, through IP service presence determination unit 28, whether the IFAX flag is ON (step S78).

When determining that the IFAX flag is ON, terminal-side controller 26 enables display 24 to display a message indicating that the IFAX service function is available (step S79), and determines whether a selection for the IFAX service function is detected within a predetermined time period (step S80). Accordingly, the user of internal terminal 4 can recognize that the communication destination has the IFAX service function, by viewing the message indicating that the IFAX service function is available.

Then, terminal-side controller 26 selects the IFAX service function within a predetermined time period and executes a signal transmission to the communication destination (e.g., mailto:ifax@panasonic.com) (step S81). Then, the operational process is terminated.

Figure 12A:
FIG. 12 generally illustrates messages generated when other types of communication are used by the internal terminal, according to the embodiment of the present invention.
Figure 12B:
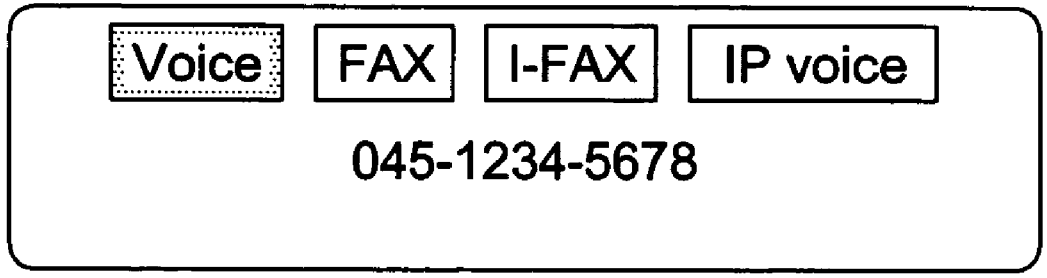
Figure 12C:

When it is determined that what is initiated at step S77 is not the fax service function, terminal-side controller 26 maintains the display of the service function of the communication destination as shown in FIG. 12(a). Then, the operational process is terminated.

In addition, when is determined that the IFAX flag is not ON at step S78, terminal-side controller 26 determines that there is no IFAX service function. Thus, terminal-side controller 26 enables the execution of signal transmission to the communication destination, using the ordinary fax service function (step S82). Then, the operational process is terminated.

According to the terminal-side NAPTR record inquiry process as shown in FIGS. 9 and 10, upon obtaining the external NAPTR record corresponding to the telephone number for the communication, some of service functions of the communication destination are displayed as a list on display 24 (as shown in FIG. 12), the service functions being shared by both internal terminal 4 and the external NAPTR record (destination terminal corresponding to the telephone number). Accordingly, the user of internal terminal 4 can recognize the available service functions of the communication destination.

In addition, according to the terminal-side NAPTR record inquiry process, the service functions of the communication destination, the function being also shared by its own service, are displayed as a list on display 24. However, when using a telephone service, for example, the user of internal terminal 4 can recognize that there is also an option of the IP telephone that has a cheaper communication cost, by the finding out that the communication destination has an IP telephone service function, when the communication destination has IP telephone service function, prior to placing a call using an ordinary telephone function.

According to the embodiment of the present invention, an internal NAPTR record for all internal terminals 4 that are managed by HGW apparatus 6 is generated and stored in HGW memory 15. DNS server 3 is notified of an external NAPTR record corresponding to a telephone number, the external NAPTR record being for the general public access and selected from the internal NAPTR record stored in HGW memory 15. Therefore, it is possible to largely decrease the processing workload of DNS server 3 by avoiding a direct access to DNS server 3 from the user, even when there is a change in the contents of the destination information relate to a telephone number.

In addition, according to the embodiment of the present invention, upon detecting an inquiry telephone number from internal terminal 4, an external NAPTR record corresponding to the telephone number is obtained from DNS server 3 and notified to internal terminal 4. Therefore, even when the user of internal terminal 4 does not have complete destination information, the user is able to recognize various service functions that are available, just by using the telephone number.

Further, according to the embodiment of the present invention, upon detecting a power-on of internal terminal 4, device information is obtained from the same internal terminal 4 so that management information is generated based on the device information, the management information including a service field that descries service functions (by device type or function type); and URI scheme specifying destination or function command. Based on the management information of all internal terminals 4, an internal NAPTR record is generated and stored/updated in the HGW memory. Accordingly, the user of internal terminal 4 can automatically update destination of internal terminal 4, as well as its function command, whenever the power is turned on.

Furthermore, according to the embodiment of the present invention, the user can specify which contents of the internal NAPTR record is allowed to be given to DNS server 3 (i.e., for the general public access), the internal NAPTR record being stored in internal NAPTR memory area 15B. Therefore, the privacy of the user is securely protected.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2003-432863 filed on Dec. 26, 2003, entire content of which is expressly incorporated by reference herein.

What is claimed is:

1. A gateway apparatus that connects to a domain name system (DNS) server and a terminal apparatus via a network, and connects to a plurality of internal terminals via an internal network, the gateway apparatus comprising:
   a memory that stores internal naming authority pointer record (NAPTR) records for the plurality of internal terminals, each of the internal NAPTR records comprising a service field and a uniform resource identifier (URI) scheme for an internal terminal, a subset of the internal NAPTR records comprising external NAPTR records, the external NAPTR records being internal NAPTR records which do not include private terminal information; and
   a transmitter that transmits only the external NAPTR records in the memory to the DNS server to enable the DNS server to store and manage the external NAPTR records.

2. The gateway apparatus according to claim 1, further comprising:
   a controller that receives a telephone number of a first internal terminal of the plurality of internal terminals from a second internal terminal of the plurality of internal terminals, and sends destination information of the first internal terminal to the second internal terminal according to the telephone number of the first internal terminal.

3. The gateway apparatus according to claim 1, further comprising:
   a detector configured to detect a power initiation of a first internal terminal of the plurality of internal terminals.

4. The gateway apparatus according to claim 3, wherein the memory is configured to store a telephone number and destination information of the first internal terminal when the detector detects the power initiation.

5. The gateway apparatus according to claim 1, further comprising:

a prohibition specification unit that selects, from management information stored in the memory, information which is prohibited from being transmitted to the DNS server.

6. The gateway apparatus according to claim 5, wherein the transmitter prohibits transmission of the selected information to the DNS server.

7. The gateway apparatus according to claim 6, wherein the transmitter allows transmission of non-selected information to the DNS server, the non-selected information being information which is not selected, by the prohibition specification unit, from the management information stored in the memory.

8. A method of providing management information for a plurality of internal terminals connected to a gateway apparatus to a domain name system (DNS) server, the method comprising:
    storing internal naming authority pointer record (NAPTR) records for each of the plurality of internal terminals in the gateway apparatus, each of the internal NAPTR records comprising a service field and a uniform resource identifier (URI) scheme for an internal terminal, a subset of the internal NAPTR records comprising external NAPTR records, the external NAPTR records being internal NAPTR records which do not include private terminal information; and
    transmitting only the external NAPTR records stored in the gateway apparatus from the gateway apparatus to the DNS server to enable the DNS server to store and manage the external NAPTR records.

9. The method according to claim 8, further comprising:
    receiving a telephone number of a first internal terminal of the plurality of internal terminals from a second internal terminal of the plurality of internal terminals; and
    sending destination information of the first internal terminal to the second internal terminal according to the telephone number of the first internal telephone.

10. The method according to claim 8, further comprising:
    detecting a power initiation of a first internal terminal of the plurality of internal terminals.

11. The method according to claim 10, further comprising storing a telephone number and destination information of the first internal terminal when the power initiation is detected.

12. The method according to claim 8, further comprising:
    selecting, from management information stored in the gateway apparatus, information which is prohibited from being transmitted to the DNS server.

13. The method according to claim 12, further comprising:
    prohibiting transmission of the selected information to the DNS server.

14. The method according to claim 13, further comprising:
    allowing transmission of non-selected information to the DNS server, the non-selected information being information which is not selected from the management information as being prohibited from being transmitted.

* * * * *